(12) United States Patent  
Skúlason

(10) Patent No.: US 9,375,989 B2  
(45) Date of Patent: Jun. 28, 2016

(54) VEHICLE SUSPENSION SYSTEM

(71) Applicant: LAUF FORKS EHF., Reykjavik (IS)

(72) Inventor: Benedikt Skúlason, Reykjavik (IS)

(73) Assignee: LAUF FORKS EHF., Reykjavik (IS)

( * ) Notice: Subject to any disclaimer, the term of this patent is extended or adjusted under 35 U.S.C. 154(b) by 0 days.

(21) Appl. No.: 14/347,454

(22) PCT Filed: Sep. 19, 2012

(86) PCT No.: PCT/IS2012/000005  
§ 371 (c)(1),  
(2) Date: Mar. 26, 2014

(87) PCT Pub. No.: WO2013/046236  
PCT Pub. Date: Apr. 4, 2013

(65) Prior Publication Data  
US 2014/0225347 A1    Aug. 14, 2014

Related U.S. Application Data

(60) Provisional application No. 61/544,761, filed on Oct. 7, 2011.

(30) Foreign Application Priority Data

Sep. 26, 2011   (IS) .............................................. 8983

(51) Int. Cl.  
*B60G 3/18* (2006.01)  
*B62K 25/04* (2006.01)  
*B62K 25/24* (2006.01)

(52) U.S. Cl.  
CPC *B60G 3/18* (2013.01); *B60G 3/185* (2013.01); *B62K 25/04* (2013.01); *B62K 25/24* (2013.01); *B60G 2300/12* (2013.01); *B62K 2025/041* (2013.01)

(58) Field of Classification Search  
CPC .......... B62K 25/04; B62K 25/24; B60G 3/18; B60G 3/185  
USPC .................................. 280/275–277, 283, 284  
See application file for complete search history.

(56) References Cited

U.S. PATENT DOCUMENTS

| 433,172 A | 7/1890 | Jett |
| 1,114,855 A | 10/1914 | Buckland |

(Continued)

FOREIGN PATENT DOCUMENTS

| CH | 224337 | 11/1942 |
| DE | 920 651 | 11/1954 |

(Continued)

OTHER PUBLICATIONS

International Search Report completed Jan. 10, 2013 for PCT/IS2012/000005. (3 pages).

(Continued)

*Primary Examiner* — Tony Winner  
(74) *Attorney, Agent, or Firm* — Staas & Halsey LLP

(57) ABSTRACT

A vehicle suspension system is provided where two or more flexible members are arranged in a non-planar way with a distance there between. These flexible members are being rigidly mounted between a frame structure of a vehicle and a wheel structure of the vehicle and the arrangement of the flexible members is so as to provide guided suspension and being resistive against forces other than those in the intended direction of the suspension movement.

9 Claims, 22 Drawing Sheets

(56) References Cited

U.S. PATENT DOCUMENTS

| | | | | |
|---|---|---|---|---|
| 1,130,828 | A | * 3/1915 | Kuehn | 280/277 |
| 1,239,035 | A | * 9/1917 | Pangman | 280/277 |
| 2,132,317 | A | * 10/1938 | Pease | 280/284 |
| 2,525,171 | A | * 10/1950 | Franks | 280/277 |
| 4,838,569 | A | * 6/1989 | Ford | 280/275 |
| 4,972,920 | A | 11/1990 | Zamitter | |
| 7,533,895 | B2 | * 5/2009 | Beal | 280/276 |
| 2005/0151344 | A1 | 7/2005 | Parkin | |

FOREIGN PATENT DOCUMENTS

| | | |
|---|---|---|
| DE | 920651 | 11/1954 |
| EP | 1104738 A2 | 6/2001 |
| EP | 2332816 | 6/2011 |
| FR | 539272 | 6/1922 |
| FR | 566 517 | 2/1924 |
| FR | 985 718 | 7/1951 |
| FR | 985718 | 7/1951 |
| GB | 00164868 | 6/1921 |
| JP | S47-017138 | 9/1972 |
| JP | H02-503783 | 11/1990 |
| JP | 2008080882 | 4/2008 |

OTHER PUBLICATIONS

Canadian Office Action issued on Jun. 9, 2015 in copending Canadian Patent Application No. 2,848,135.

Japanese office action issue on Feb. 17, 2015 in copending Japanese Patent Application No. 2014-531381.

Japanese Office Action dated Feb. 9, 2016 in corresponding Japanese Patent Application No. 2014-531381.

* cited by examiner

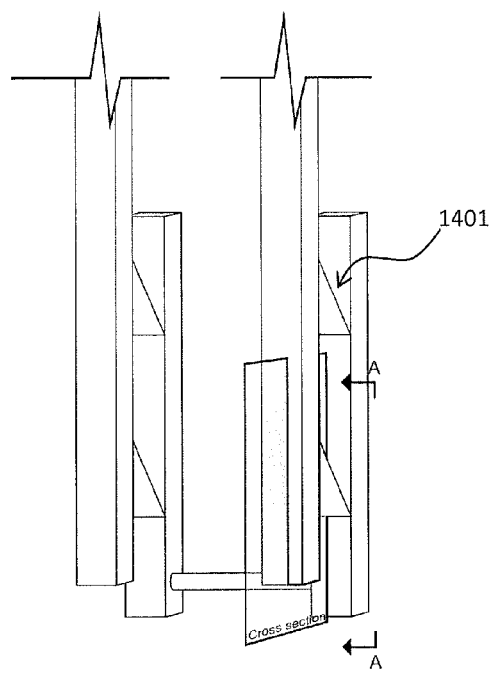
FIG. 14
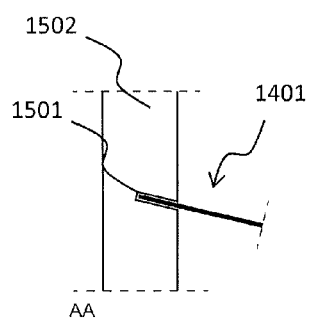 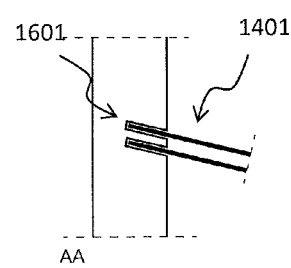 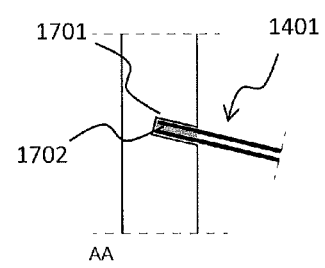
FIG. 15    FIG. 16    FIG. 17

VEHICLE SUSPENSION SYSTEM

CROSS-REFERENCE TO RELATED APPLICATIONS

This application is related to and claims the benefit of priority to International Application No. PCT/IS2012/000005 filed Sep. 19, 2012, Icelandic Patent Application No. 8983 filed Sep. 26, 2011 and U.S. Provisional Patent Application No. 61/544,761 filed Oct. 7, 2011, the contents of which are hereby incorporated by reference.

FIELD

The present invention relates to a vehicle suspension system, and to a vehicle comprising such a suspension system.

BACKGROUND

Today's bike (bicycles and motorbikes) suspension systems utilize telescopic sliding surfaces to guide the compression of its suspension and damping unit (called shock here after). The suspended wheel can be connected directly to the telescopic shock, as is the case with most front suspension systems. The suspended wheel can also be connected to the shock through links and pivots, gearing up or down the forces and displacement the shock experiences while reducing perpendicular loads on the shock, as is usually the case with rear wheel suspension systems. Modern telescopic shocks most commonly utilize either springs or compressed air for suspension and hydraulics for dampening.

While modern air-sprung telescopic suspension systems are fairly lightweight and perform acceptably, they can't escape the heft and friction of its telescopically sliding surfaces and/or links and pivots. The friction in the sliding surfaces and pivots demands a relatively tight maintenance schedule, and associated cost for the user.

In the case when the shock is connected directly to a suspended wheel the shock has to be very strong to be able to take up the perpendicular forces it encounters. Furthermore, the telescopic system has to be fairly long to allow for the required suspension travel. This results in increased weight. Additionally, telescopic mechanisms are limited to in-line movements throughout its suspension range.

However, if the shock is operated through links and pivots connecting it to the suspended wheel, the shock itself can be made smaller and lighter, but the weight of pivots and links is added. Also, adding pivots requires maintenance of these pivots.

Furthermore, the static friction of telescopic shocks and pivots makes it hard for them to absorb small hits and the initial spike of larger hits.

US 2005/0151344 describes a rear suspension bicycle frame. The rear portion of the frame includes a chainstay assembly including a pair of chainstay tubes arranged in a co-planar way extending from the bottom bracket towards the dropouts. The chainstay tube is thicker at its opposite ends and thinner at a location in between, allowing the chainstay to flex at its thinner section while being stiffer at its thicker sections. The main goal of this chainstay configuration is to eliminate a single pivot in a rear suspension system, a pivot that is usually placed where the chainstay meets the bottom bracket. To create a functional rear suspension frame, these chainstay tubes will require assistance from a suspension and damping unit to take up the forces in the suspension and some links and pivots to guide the motion along the appropriate path. Based on the above, this reference does not replace suspension systems utilizing telescopic sliding surfaces and or links and pivots.

The inventor of the present invention has appreciated that there is thus a need for an improved and simplified suspension system without said supplementary means of suspension guiding such as sliding surfaces, links and pivots and has in consequence devised the present invention.

SUMMARY

A vehicle suspension system including at least two flexible members arranged in a non-planar way with a distance there between, where the at least two flexible members are rigidly mounted between a frame structure of a vehicle and a wheel structure of said vehicle. According to an embodiment, arrangement of said flexible members is such that a guided suspension is provided that is resistive against forces other than those in an intended direction of a suspension movement.

According to another aspect, the present invention relates to a vehicle comprising said suspension system. In one embodiment, said vehicle is selected from being: a bike, a bicycle, a motorbike, a motorized bicycle, a scooter or a tricycle.

In one embodiment, vehicle suspension system assembly includes at least two flexible members, a wheel structure, and mounting means adapted for mounting the at least two flexible members between said frame structure of a vehicle and said wheel structure of said vehicle in a non-planar way with a distance between said at least two flexible members such that a guided suspension is provided that is resistive against forces other than those in the intended direction of the suspension movement.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIGS. 14, 15, 16, 17, 18, 19, 20, 21, 22 and 23 show different embodiments of rigid connections between a flexible member and a rigid structure according to the present invention. Said rigid structure being a wheel structure or frame structure.

DETAILED DESCRIPTION

Figure 1:
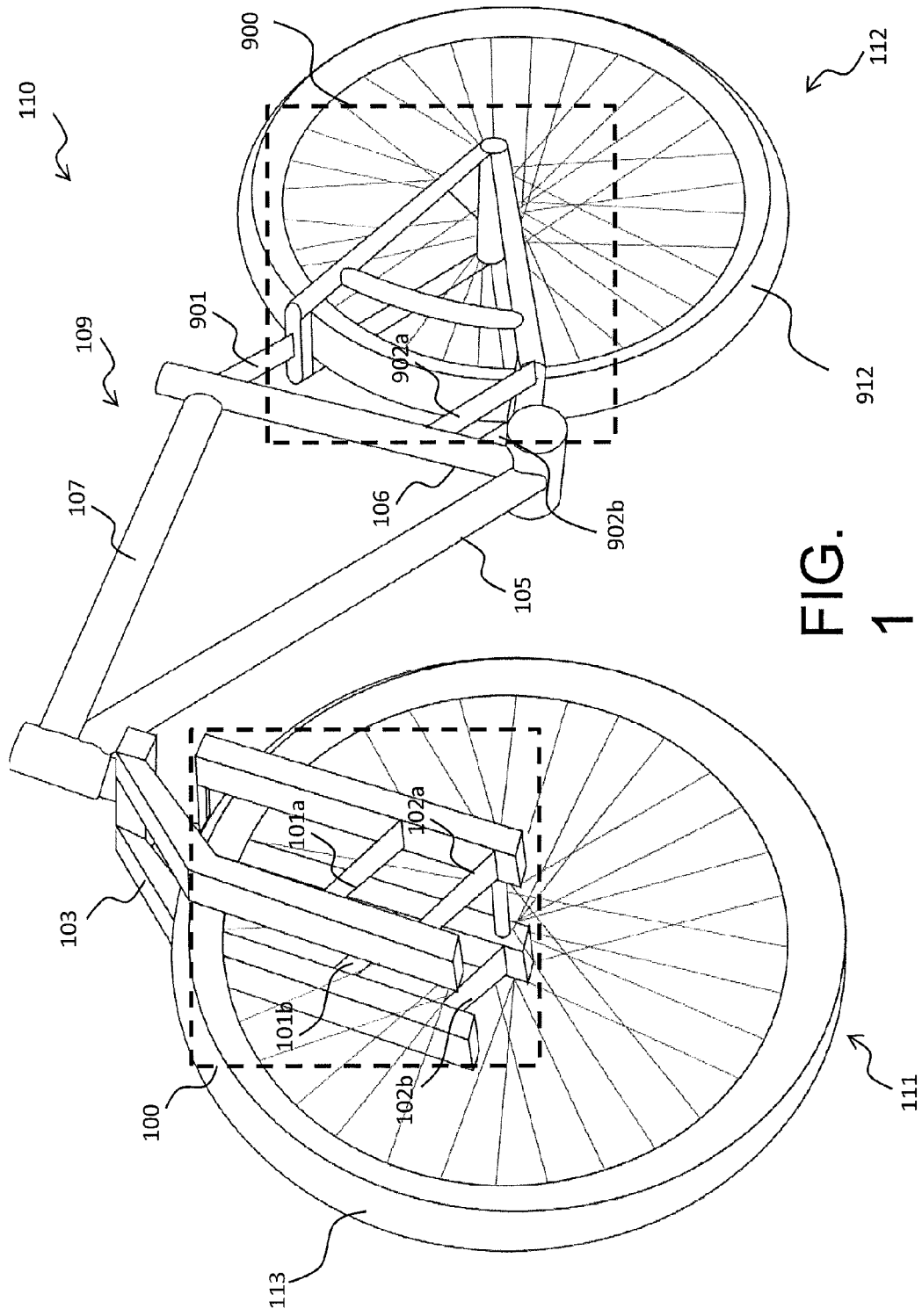
FIG. 1 shows a perspective view an embodiment of a vehicle comprising vehicle suspension systems according to the present invention.

Reference will now be made in detail to the embodiments, examples of which are illustrated in the accompanying drawings, wherein like reference numerals refer to the like elements throughout. The embodiments are described below to explain the present invention by referring to the figures.

It would be advantageous to achieve a simplified suspension without the supplementary means of suspension guiding that requires less maintenance and has a better response to excitation and eliminates the weight of additional components. In general, the invention preferably seeks to mitigate, alleviate or eliminate one or more of the above mentioned disadvantages singly or in any combination. In particular, it may be seen as an object of the present invention to provide a suspension mechanism that solved the above mentioned problems, or other problems, of the prior art.

To better address one or more of these concerns, in a first aspect of the invention a vehicle suspension system is provided comprising at least two flexible members arranged in a non-planar way with a distance there between, the at least two flexible members being rigidly mounted between a frame structure of a vehicle and a wheel structure of said vehicle, the arrangement of said flexible members being such that a guided suspension is provided that is resistive against forces other than those in the intended direction of the suspension movement.

Accordingly, a suspension system is provided where the flexible members can provide suspension without supplementary means of suspension guiding, i.e. sliding surfaces and/or links and pivots, which makes the suspension system almost maintenance free. Also, the response to excitation is greatly enhanced and the weight of additional components such as telescopic arms and/or links and pivots is eliminated which reduces the weight of the suspension system.

In one embodiment, said flexible members are substantially flat plates, the dimensions of the cross section being such that the width is substantially greater than its height, said width being substantially parallel to ground when said vehicle suspension system is in a vertical position in relation to the ground. This gives increased resistance against forces other than those working in the direction of the intended suspension path.

In one embodiment, said at least two flexible members are of substantially equal length and are arranged in a substantially parallel way. It is thus ensured that the stresses in the flexible members are distributed optimally.

In one embodiment, said at least two flexible members extend, in relation to the wheel structure, in an upwards direction from said wheel structure and forward towards the frame structure. This gives a good response to head-on excitation and enables the suspension to have larger maximal displacement.

In one embodiment, said at least two flexible members form one or more bundles of closely spaced flexible members. Accordingly, stacking the flexible members up in closely spaced bundles enables them to flex further than a single thicker member could do while being able to carry the same maximal load.

In one embodiment, the suspension system further comprises an upwardly extending damper arranged from the wheel structure to the frame structure. Hence, further control of the dynamics of the suspension is provided by means of absorbing compression and rebound energy where desired and a lock-out function possibility of the suspension is provided.

In one embodiment, said suspension system is a front wheel suspension system, said frame structure including a two legged fork and where said wheel structure includes wheel structure beams positioned posterior to the two legged fork on both lateral sides of the front wheel and comprises an anteriorly located hub mount on each side connected together with one or more rigid connections, wherein said at least two flexible members are located on each lateral side of the wheel and are rigidly mounted to said two legged fork of said frame structure and said wheel structure beams.

Thus, a suspension mechanism is provided on both sides of the front wheel with a rigid connection between the sides, this significantly increases the lateral stiffness of the front wheel suspension system.

In one embodiment, said suspension system is a rear wheel suspension system and said wheel structure is a rear wheel structure, where said at least two flexible members connect the posterior part of said frame structure to a said rear wheel structure, where the said rear wheel structure is posterior to the frame structure on both lateral sides of the rear wheel and has a posteriorly located hub mount on each side of the rear wheel structure, the sides being connected together with one or more rigid connections.

Thus, a suspension mechanism is provided on both sides of the rear wheel with a rigid connection between the sides, this significantly increases the lateral stiffness of the rear wheel suspension system.

In one embodiment, said at least two flexible members of said suspension system connecting the wheel structure to the frame structure are substantially laterally symmetric around the respective suspended wheel, providing a balanced and guided suspension response to excitation of the wheel.

The present invention relates to a suspension system for a vehicle by utilizing two or more flexible members connecting the frame-side of the vehicle to the wheel-side, where the travel of the suspension follows a curved path, where by altering the configuration of the system different travel paths are achieved, depending on desired response to excitation forces. These flexible members can provide suspension without supplementary means of suspension guiding, i.e. sliding surfaces and/or links and pivots, which is reflected in less maintenance and better response to excitation. Also, the weight of additional components such as telescopic arms and/or links and pivots is eliminated.

FIG. 1 shows a perspective view of an embodiment of a vehicle 110 comprising vehicle suspension systems 100, 900 according to the present invention. The vehicle 110 may be selected from, but is not limited to, a bike, a bicycle, motorized bicycle, a motorbike, a scooter or a tricycle. As depicted here, the vehicle comprises a frame structure 109 including a top tube 107, a seat tube 106, a down tube 105, a two legged bike fork 103 and a front wheel structure 111 and a rear wheel structure 112.

In the embodiment shown here the vehicle 110 is a bicycle including both a front and rear wheel suspension systems 100, 900, but the bicycle could just as well include only a front wheel suspension system 100 or only a rear wheel suspension system 900. The front and rear wheel suspension systems 100, 900 shown here comprise, respectively, two flexible members 101a,b, 102a,b, 901, 902a,b arranged in a non-planar way with a distance there between that are rigidly mounted between the frame structure 109 of the bicycle 110 and the front and rear wheel structures 111, 112, respectively. As depicted here the frame structure 109 includes a two legged fork 103 where the rigid mounting to the frame structure is to the two legged fork. This will be discussed in more details in relation to FIG. 3. The arrangement of the flexible members 101a,b, 102a,b, 901, 902a,b is such that the suspension system provides guided suspension and is resistive against forces other than those in the intended direction of the suspension movement.

The flexible members may be made of any kind of material that has high flexibility, high flexural strength, good fatigue properties and low weight, such as various composite materials, for example; carbon fiber, glass fiber, basalt fiber, flax fiber, boron fiber or aramid fiber, or metals, for example various titanium alloys.

Figure 2:
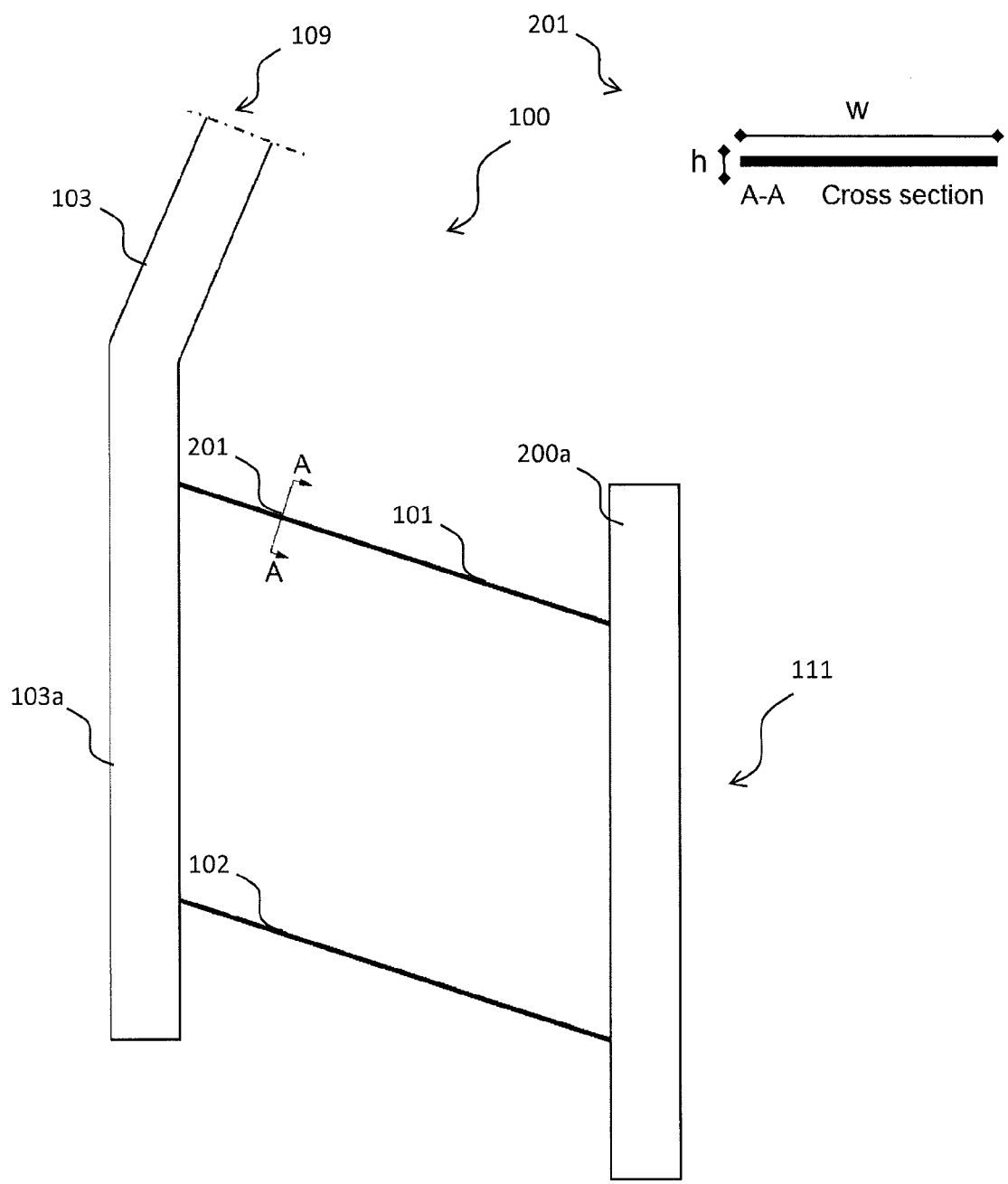
FIG. 2 shows an expanded side view of the front wheel suspension system shown in FIG. 1.

FIG. 2 shows an illustrative side view of a front wheel suspension system 100 according to the present invention. Shown is also a zoomed up view 201 of the cross section of a flexible members 101, 102, where the shape of the cross section is substantially rectangular and the dimension of the cross section is such that the width (w) is several times greater than its height (h) and forms a thin plate structure, and where the width is substantially parallel to ground when the front wheel suspension system 100 is in a vertical position in relation to the ground.

As depicted here, the two flexible members 101, 102 are parallel, of substantially equal length and rigidly mounted to the two opposite beams 103a, 200a at each lateral sides of the front wheel (see FIG. 1), one beam being a leg 103a of the bike fork 103 belonging to the frame structure 109 and the other one being a wheel structure beam 200a belonging to the wheel structure 111.

Figure 3:
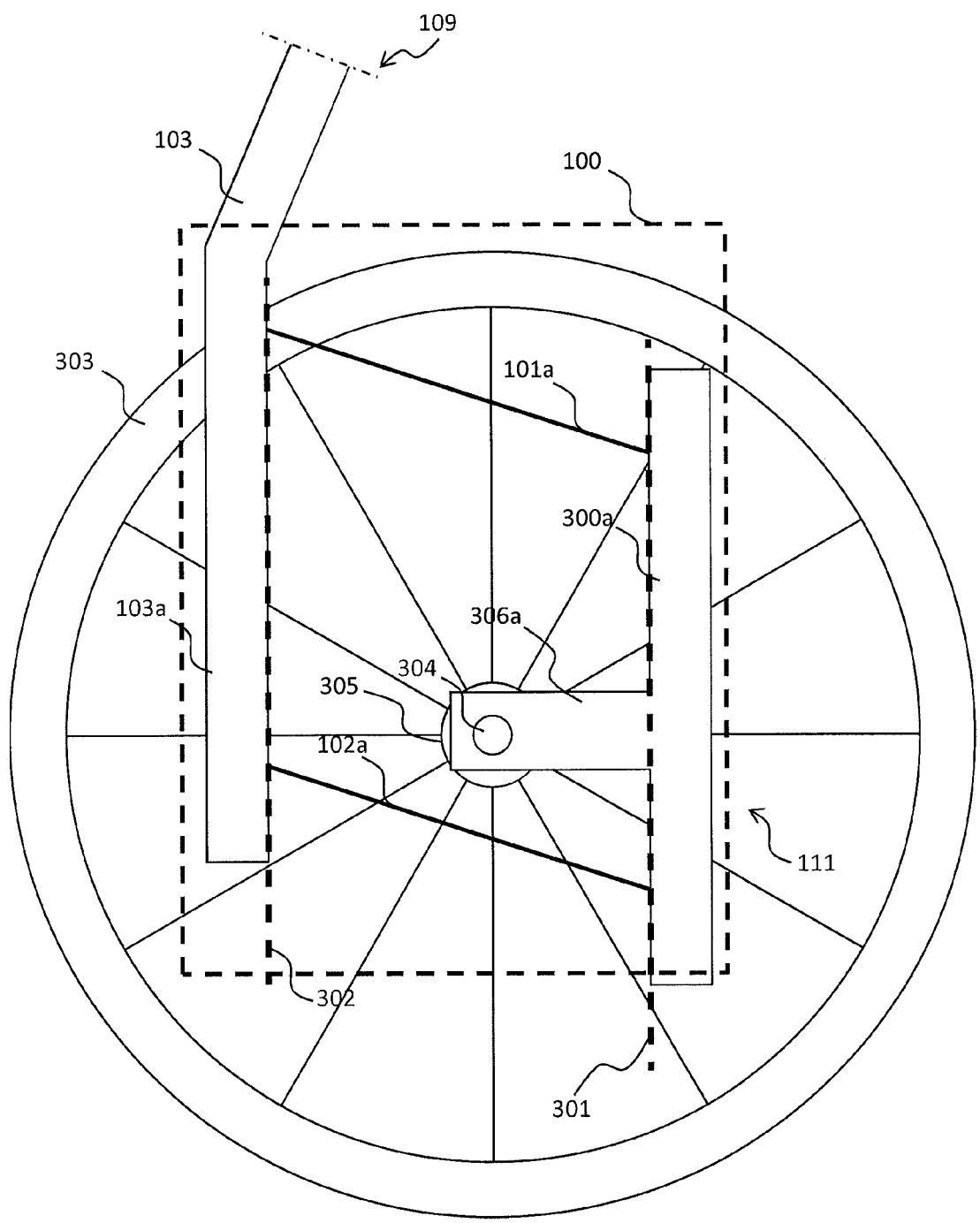
FIG. 3 shows a side view of an embodiment of a front wheel suspension system according to the present invention.

FIG. 3 shows a side view of an embodiment of a front wheel suspension system 100 according to the present invention, where the front wheel structure 111 includes wheel structure beam 300a positioned posterior to the two legged bike fork 103 on both lateral sides of the front wheel 303 and has an anteriorly located hub mount 304 on each side of the wheel 303 connected together with one or more rigid connections, where the hub mount 304 can serve as one rigid connection. The rigid connections may be e.g. a piece of metal or composite material rod and the like extending through the hub 305 of the wheel 303. The posteriorly located wheel structure beam 300a shown here has a lateral protruding portion 306a that is rigidly connected to the hub mount 304 and a vertical portion 300a. As will be discussed in more details in relations to FIGS. 6-8 the shape of the wheel structure 111 as well as the shape of the fork legs 103a,b should not be construed as being limited to the geometrical forms shown here.

In this embodiment the two flexible members 101a, 102a are arranged in a substantially parallel way when the front wheel suspension system 100 is in a rest position to ensure that the stresses in the flexible members are distributed optimally. Also, the rigid connections between the two flexible members 101a, 102a and the two legs 103a of the fork 103, belonging to the frame structure 109, are substantially co-planar in the plane 302 on both lateral sides of the front wheel 303. In the same way, the two flexible members 101a, 102a are rigidly connected to the posteriorly located wheel structure beam 300a substantially co-planar in the plane 301. These two planes 301, 302 are preferably parallel when the front wheel suspension system 100 is in a rest position. Further, as shown here, it is preferred that the two (or more) flexible members 101a, 102a extend, in relation to the wheel structure 111, in an upwards direction from the wheel structure 111 and towards the frame structure 109.

Figure 4:
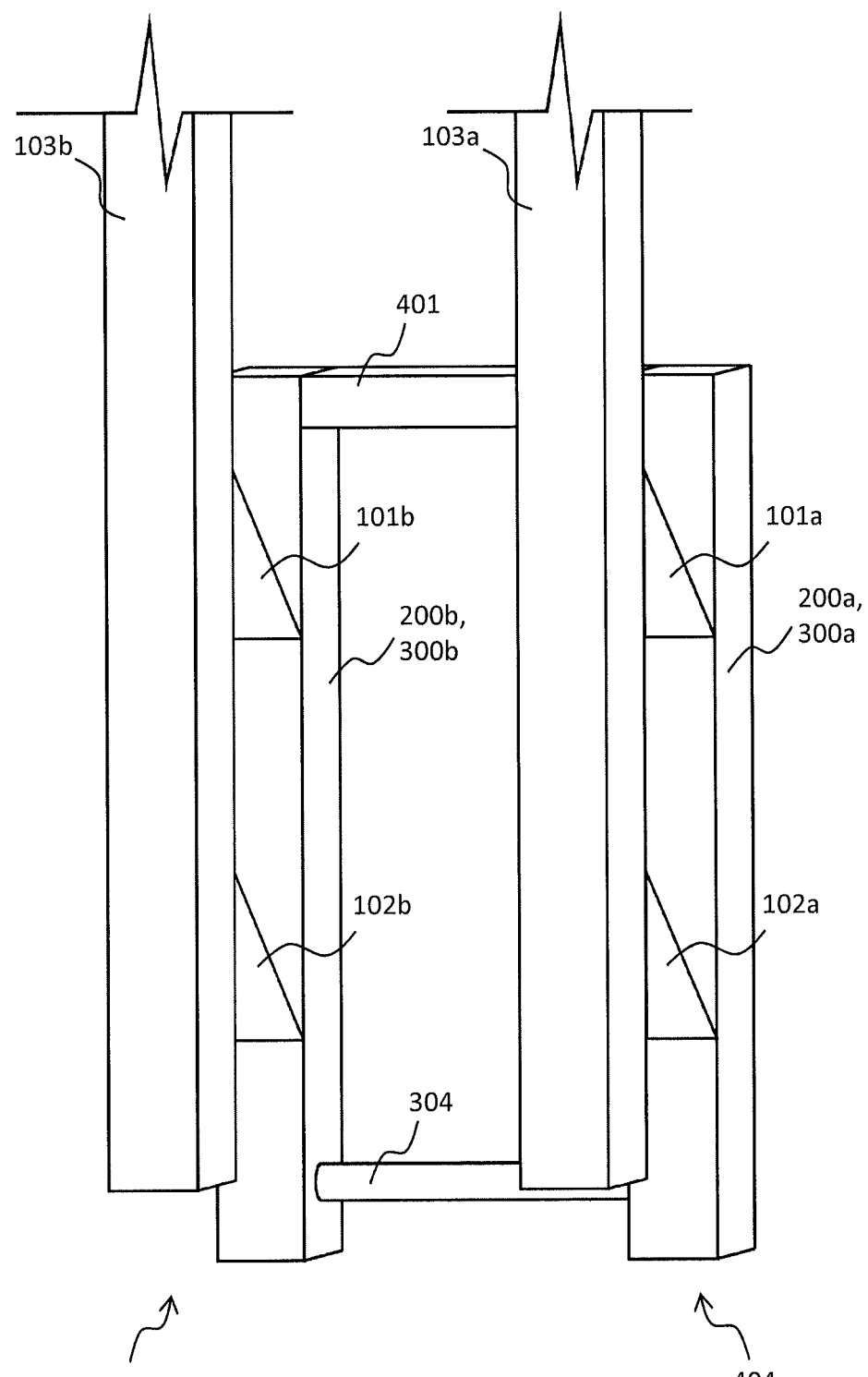
FIG. 4 depicts a perspective view of the front wheel suspension system 100 shown in FIGS. 1 and 2.

FIG. 4 depicts a perspective view of a variation of the front wheel suspension system 100 shown in FIGS. 2 and 3 showing the two lateral sides 403, 404 of the front wheel 203 (not shown), with said two upwardly extending bicycle (vehicle) fork legs 103a, 103b and said upwardly extending wheel structure beams 200a,b, 300a,b (the laterally protruding structure 306 from FIG. 3 is non-existing in this embodiment, as a result of a different hub mount 304 location). Shown is also the flexible members 101a,b, 102a,b rigidly mounted there between. The hub mount 304 that may extend through the hub (not shown) of the front wheel for rigidly mounting the wheel structure beams 200a,b, 300a,b to the wheel system. This embodiment further comprises a rigid member 401 that may be positioned above the front wheel for rigidly mounting the upwardly extending wheel structure beams 200a,b, 300a,b together.

Figure 5:
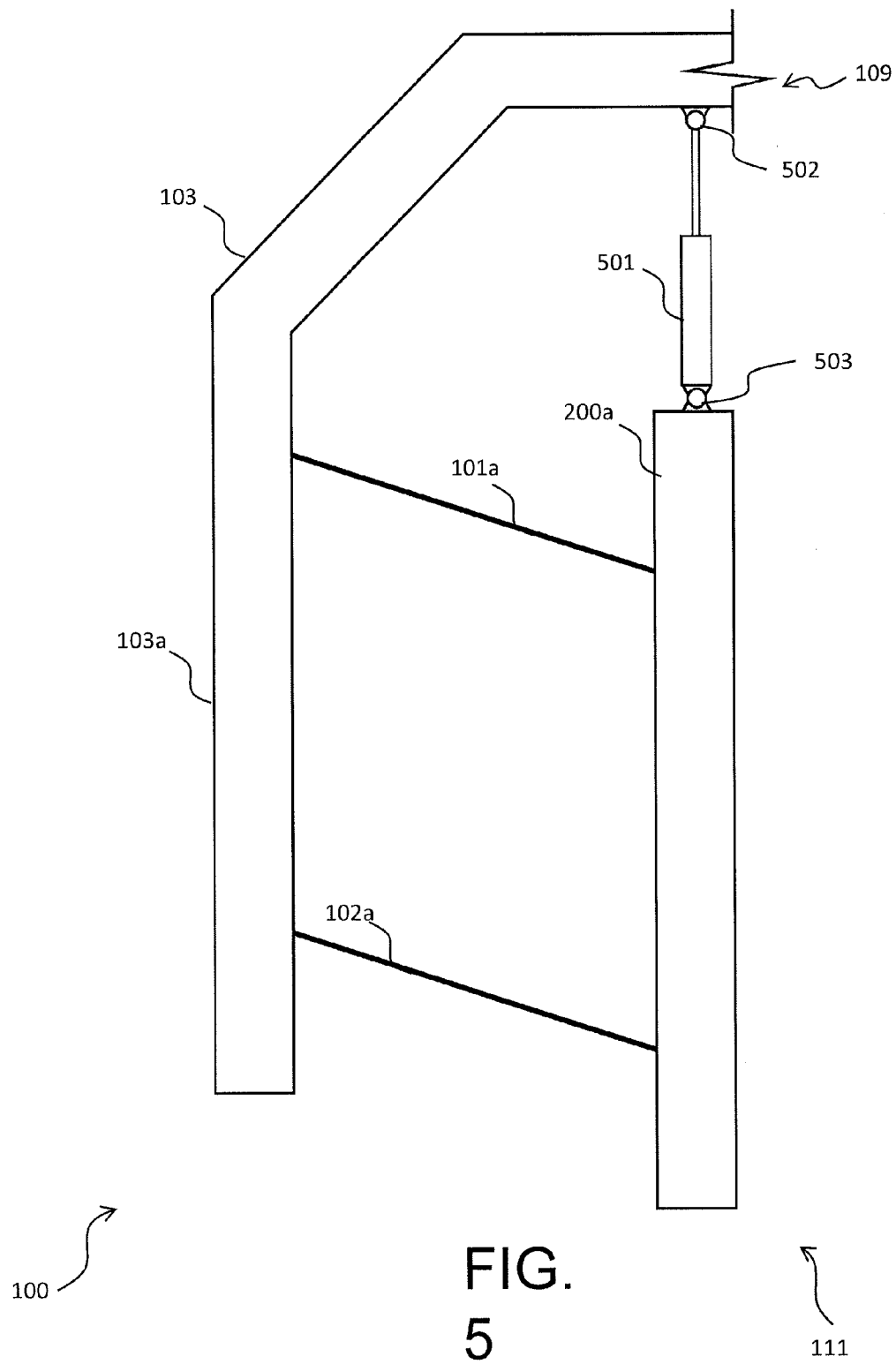
FIG. 5 shows an embodiment of the front wheel suspension system shown in FIG. 2 where the front wheel suspension system further comprises an upwardly extending damper.

FIG. 5 shows an embodiment of the front wheel suspension systems 100 shown in FIG. 2 where the front wheel suspension systems 100 further comprises an upwardly extending damper 501 arranged from the wheel structure beam 200a to the frame structure 109. As shown here, the damper 501 comprises pivots 502, 503 on each end. The damper 501 is mounted between the wheel structure beam 200a and the frame structure 109 of the bicycle in substantially vertical way. By arranging such a damper 501 there between a further control of the dynamics of the suspension is provided since compression and rebound energy can now be absorbed. This arrangement also provides an option of a lock-out function of the suspension system. The placement of the damper should not be construed as being limited to the geometrical forms shown here.

Figure 6:
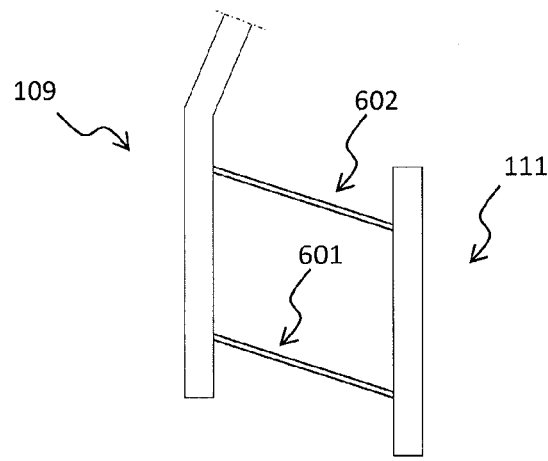
FIGS. 6, 7 and 8 show different embodiment of a front wheel suspension system according to the present invention.
Figure 7:
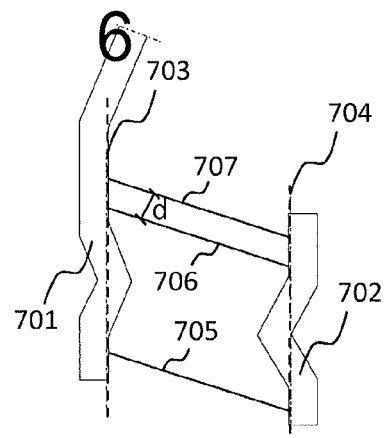
Figure 8:
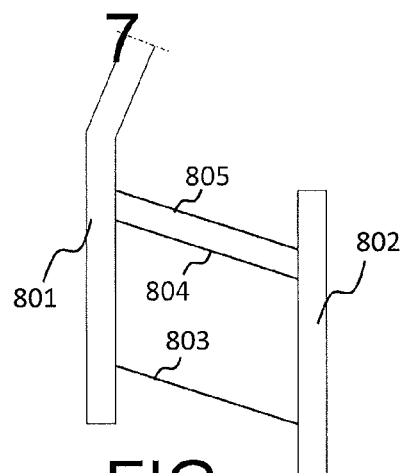

FIGS. 6-8 show different embodiments of a front wheel suspension system 100 according to the present invention. In FIG. 6, the at least two flexible members form bundles 601, 602 of closely spaced flexible members at the opposite ends of the wheel structure 111 and frame structure 109 where the number of flexible members within each bundle is two or more and where the flexible members within each bundle are preferably parallel. FIG. 7 shows an embodiment where the wheel structure beam 702 and the leg 701 of the fork are V-shaped and where the number of flexible members is three, one 705 extending from the bottom of the wheel structure beam 702 upward and towards the fork leg 701, a second and third flexible members 706, 707 situated at the opposite end where the internal arrangement between the second and third flexible members 706, 707 is such that there is a pre-determined distance d between them which can be few millimeters up to several centimeters. The flexible members 705-707 are rigidly mounted to the fork leg 701 and the wheel structure beam 702 in a parallel way. The dotted lines 703, 704 indicate that the connections between the flexible members and the frame structure 701 are in a plane parallel to a plane running through the connections between said flexible members and wheel structure 702. FIG. 8 shows the embodiment from FIG.

7 with three flexible members 803, 804, 805 two of which being positioned at the upper end of the front wheel suspension system and one flexible member 803 being positioned at the opposite end, but where the wheel structure beam 802 and the fork leg 801 are straight elongated beams.

Figure 9:
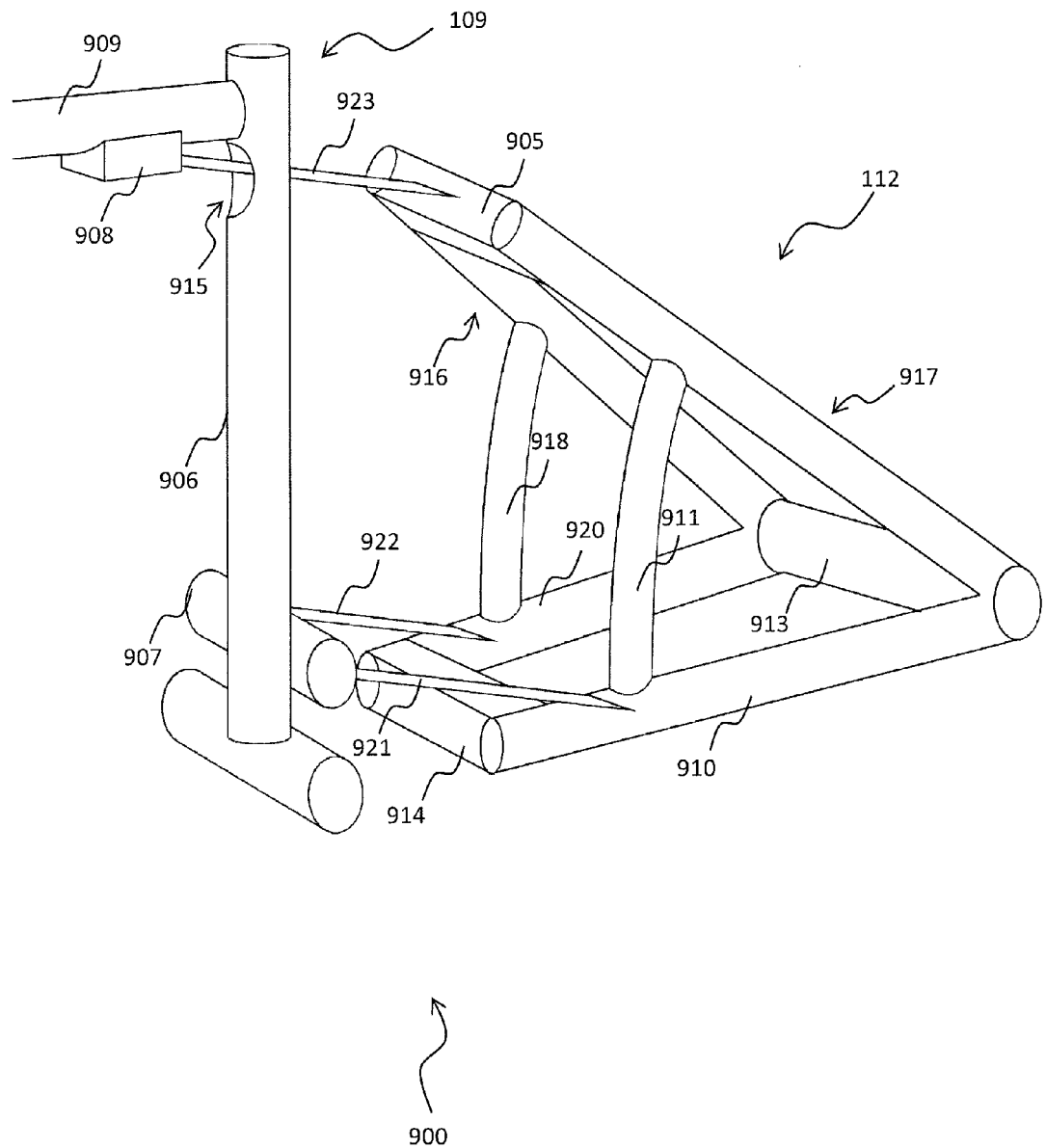
FIGS. 9, 10, 11, 12 and 13 show different embodiments of a suspension system according to the present invention wherein said suspension system is a rear wheel suspension system.

FIG. 9 shows one embodiment of a suspension system 900 according to the present invention wherein the suspension system is a rear wheel suspension system and the wheel structure is a rear wheel structure 112. The frame structure 109 in this embodiment comprises a support means 907 rigidly mounted to the lower section of the seat tube 906 facing the rear wheel structure 112 and support means 908 mounted to the top tube 909 of the frame structure. The rear wheel structure 112 comprises two V-shaped structures 916, 917 rigidly mounted together via rigid members 905, 913, 911, 918, 914. The hub mount is a horizontal beam 913 that at the same time acts as a further support for rigidly mounting the V-shaped structures together. There are three flexible members 921, 922, 923 that connect the posterior part of the frame structure 109 to the anterior part of the rear wheel structure 112, two flexible members 921, 922 that are in-plane and extend from the chainstays 910, 920 upward and towards said support means 907 mounted to the seat tube 906. The third flexible member 923 extends between said horizontal beam 905 upwards and towards said support means 908 mounted to the top tube 909 of the frame structure 109 via a hole 915 in the seat tube 906.

Figure 10:
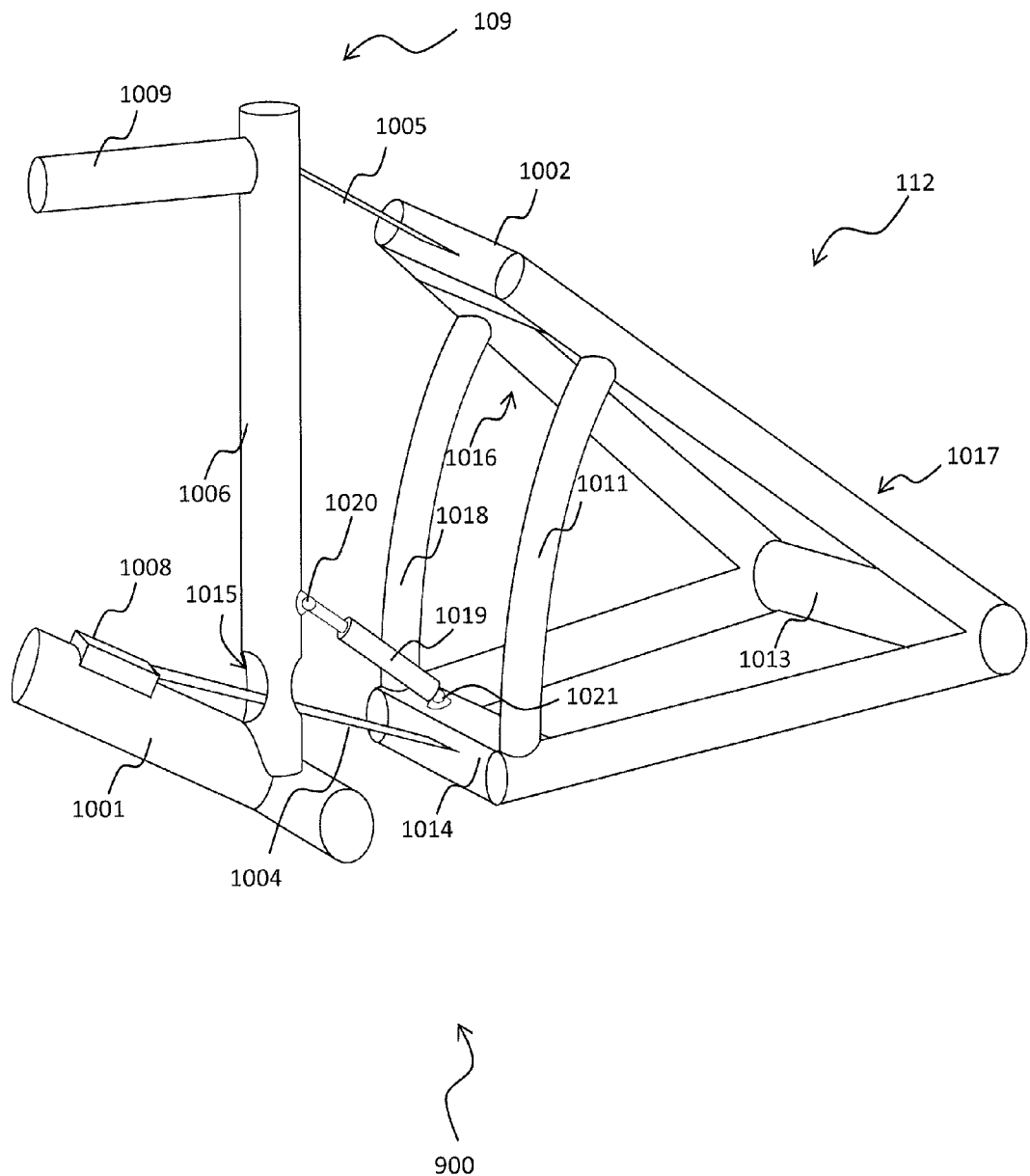

FIG. 10 shows another embodiment of a rear wheel suspension system 900 according to the present invention. The frame structure 109 in this embodiment comprises a seat tube 1006, a top tube 1009, a down tube 1001 facing the rear wheel structure 112 and support means 1008 mounted to the down tube 1001 of the wheel structure. Similar as discussed in relation to FIG. 9 the rear wheel structure 112 comprises two V-shaped structures 1016, 1017 rigidly mounted together via rigid members 1013, 1011, 1018, 1014, 1002. As shown here, the arc-shaped rigid members 1011, 1018 compared to the ones shown in FIG. 9, 911, 918, are positioned at the distal ends of the of V-shaped structures 1016, 1017. The hub mount in this embodiment is the horizontal beam 1013 that simultaneously is used to rigidly mounting the two V-shaped structures 1016, 1017 together. The two flexible members 1004, 1005 that connect the posterior part of the frame structure 109 to the anterior part of the rear wheel structure 112 extend from the two horizontal beams 1002, 1014 upwards and towards the upper end of the seat tube 1006 and via a hole 1015 in the seat tube towards the support means 1008, respectively. This embodiment further comprises an upwardly extending damper 1019 between the frame structure 109 and the wheel structure 112, connected to respective sides by pivots 1020, 1021, further controlling the dynamics of the suspension by means of absorbing compression and rebound energy where desired and a lock-out function possibility of the suspension is provided.

Figure 11:
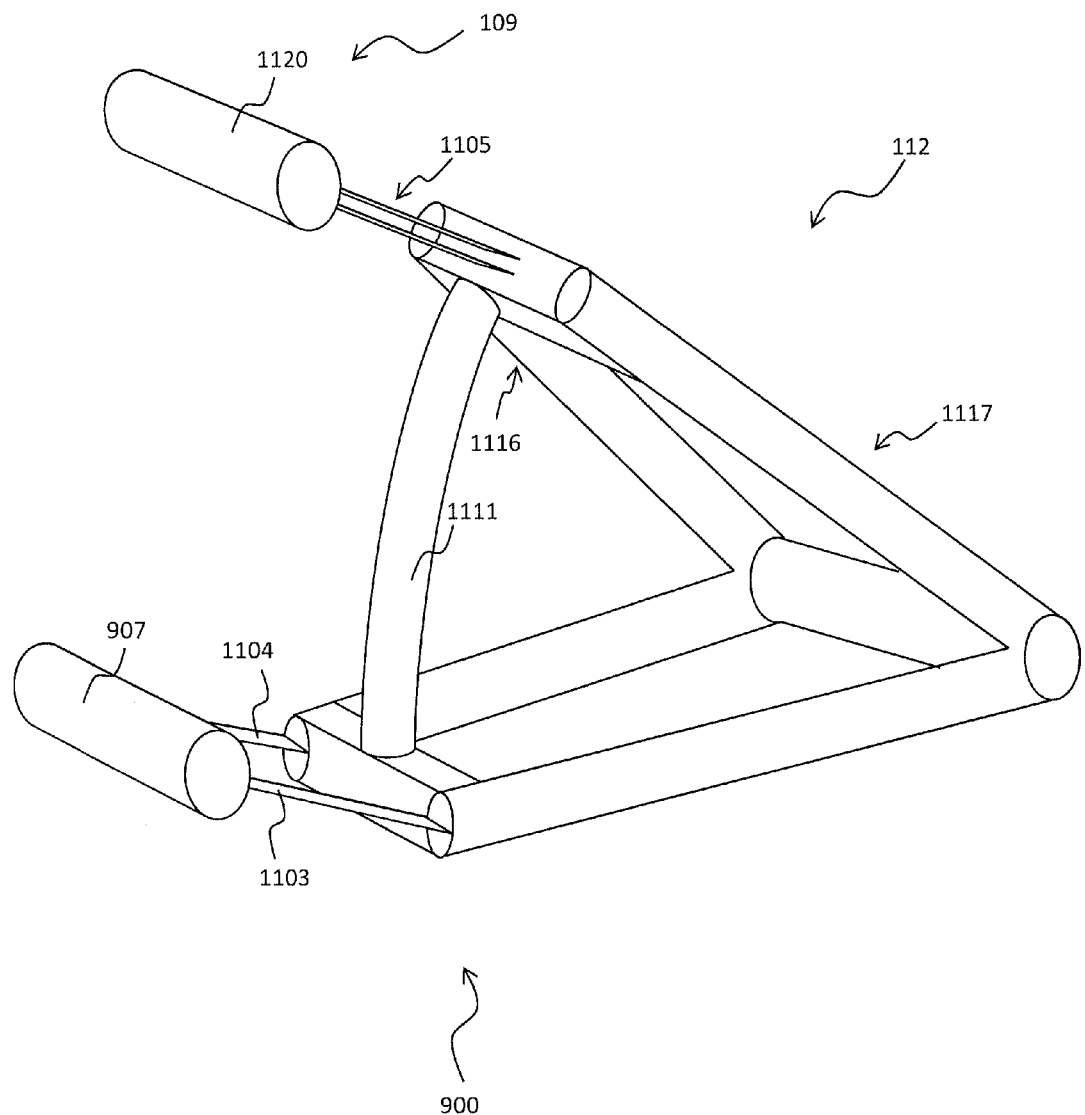

FIG. 11 shows another variation of the embodiment shown in FIG. 9 where the arc-shaped rigid members 1011, 1018 from FIG. 10 are replaced with a single rigid member 1111 positioned at the distal end of the of V-shaped structures 1116, 1117 and where a bundle of two or more tightly stacked flexible members 1105 provides the connection between the upper part of the rear wheel structure 112 to a support means 1120 rigidly mounted to the frame structure 109. The flexible members 1103, 1104 connect the posterior part of the frame structure 109, at the support means 907, to the anterior part of the rear wheel structure 112.

Figure 12:
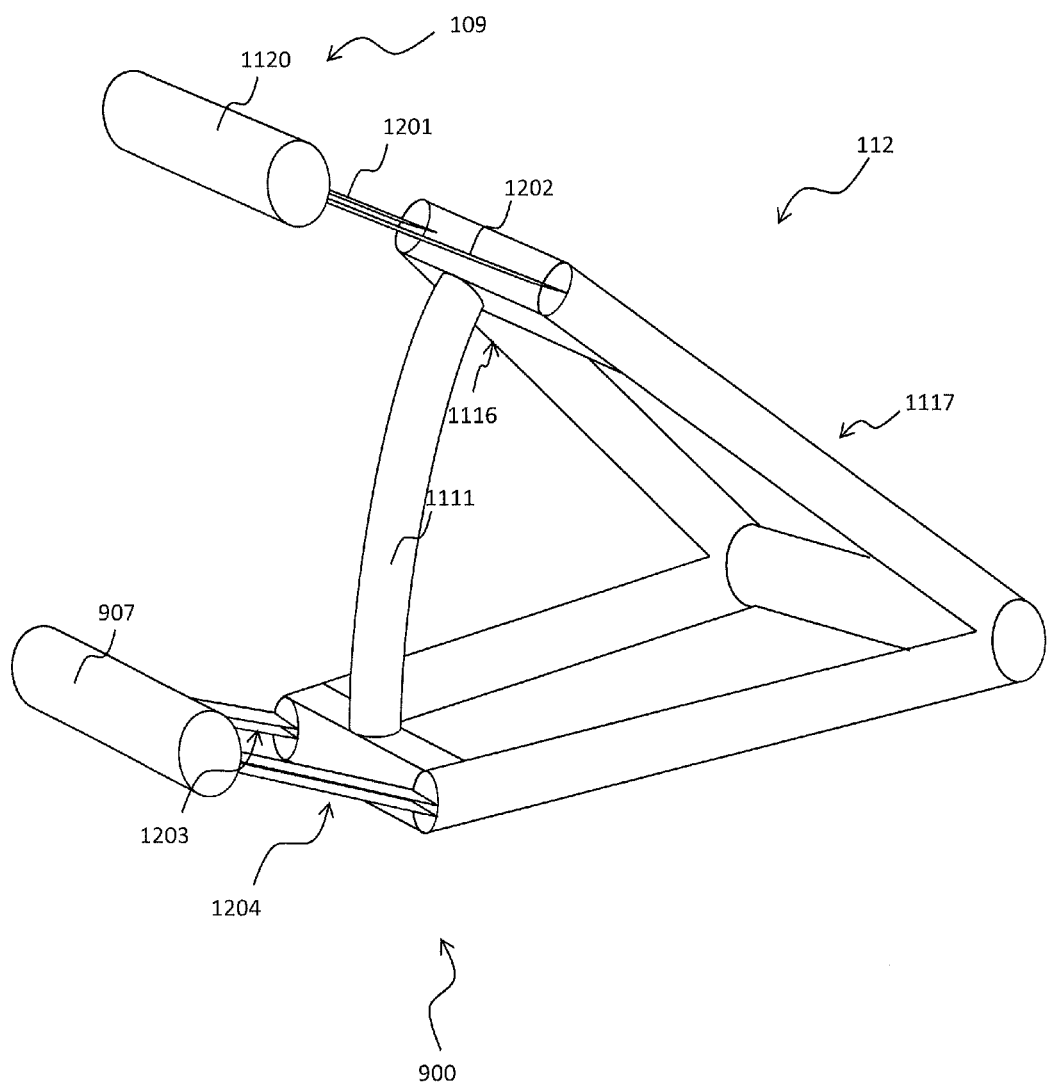

FIG. 12 shows a variation of the embodiment shown in FIG. 11, comprising two laterally spaced flexible members 1201, 1202 providing the connection between the upper part of the rear wheel structure 112 and the upper part of the frame structure 109 and comprising two laterally spaced bundles of two or more tightly stacked flexible members 1203, 1204 providing the connection between the lower part of the rear wheel structure 112 and the lower part of the frame structure 109.

Figure 13:
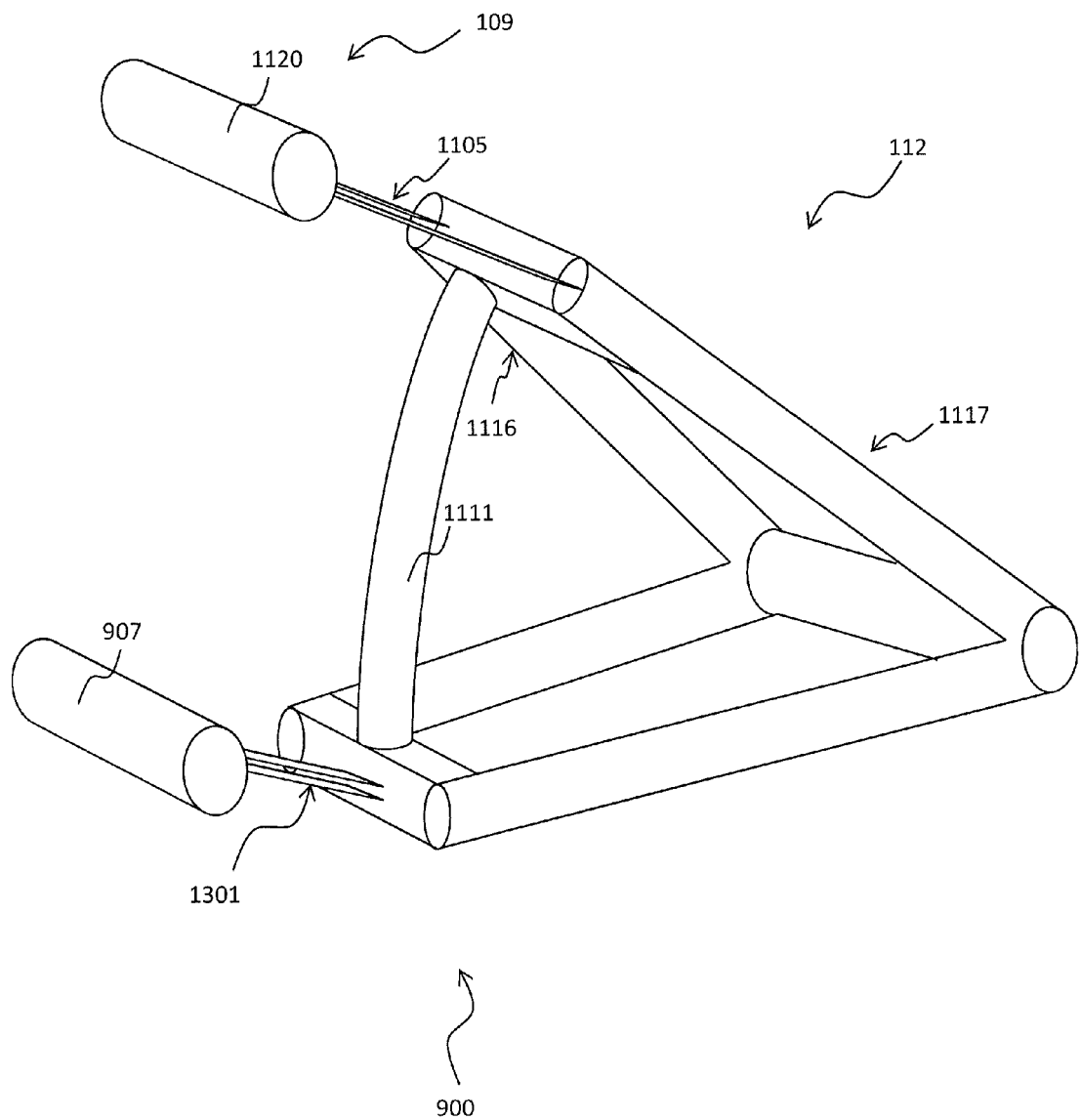
Figure 18:
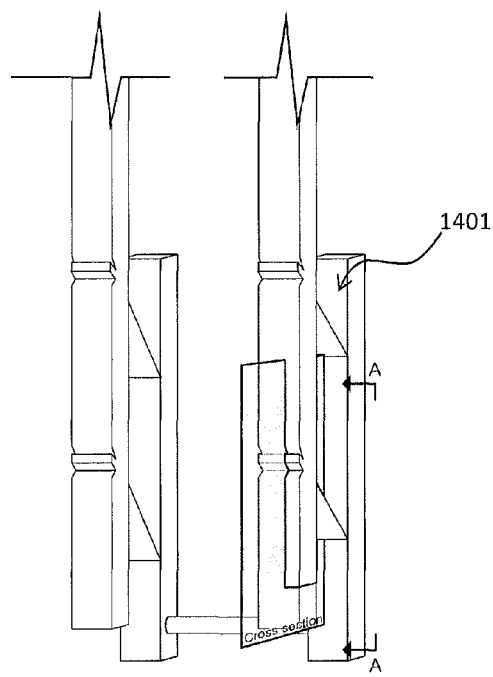
Figure 19:
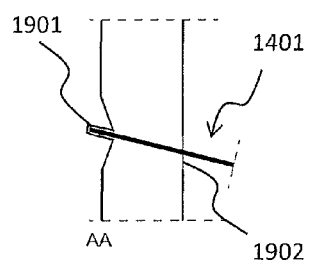
Figure 20:
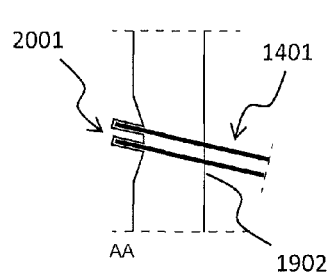
Figure 21:
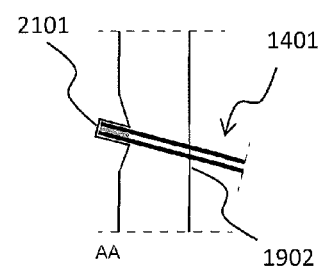

FIG. 13 shows another variation of the embodiment shown in FIG. 12, comprising a single bundle of two or more tightly stacked flexible members 1301 providing the connection between the lower part of the rear wheel structure 112 and the lower part of the frame structure 109.

FIG. 14 shows a section cut A-A of a perspective view of the front wheel suspension system 100, a part of this section cut is examined in detail in FIGS. 15-17 providing a view of different embodiments of rigidly mounting a flexible member or a bundle of flexible members 1401 of the present invention to a wheel structure or frame structure.

FIG. 15 shows an embodiment of the invention where one of said two or more flexible members 1401 is rigidly mounted into a pocket 1501 in a rigid structure 1502, said rigid structure being a front wheel structure 111, rear wheel structure 112 or a frame structure 109. Said pocket being substantially deeper than the height of its opening. Said one or more flexible members are rigidly mounted by methods such as bonding, clamping, bolting or press-fitting.

FIG. 16 shows a variation of the embodiment in FIG. 15 where said two or more flexible members 1401 are rigidly mounted into tightly spaced pockets 1601 in said rigid structure. Said pockets being substantially deeper than the height of their opening.

FIG. 17 shows a variation of the embodiment in FIG. 15 where said two or more flexible members 1401 are spaced apart from one another by a e.g. metallic or composite material spacer 1702 and mutually rigidly mounted into a single pocket 1701 in said rigid structure.

FIGS. 18-21 show variations of the embodiments shown in FIGS. 14-17 where said one or more of said two or more flexible members 1401 pass through a hole 1902 on one side of a hollow wheel structure or hollow frame structure and are rigidly mounted to a pocket 1901, 2001, 2101 on the opposite wall of the respective hollow structure.

Figure 22:
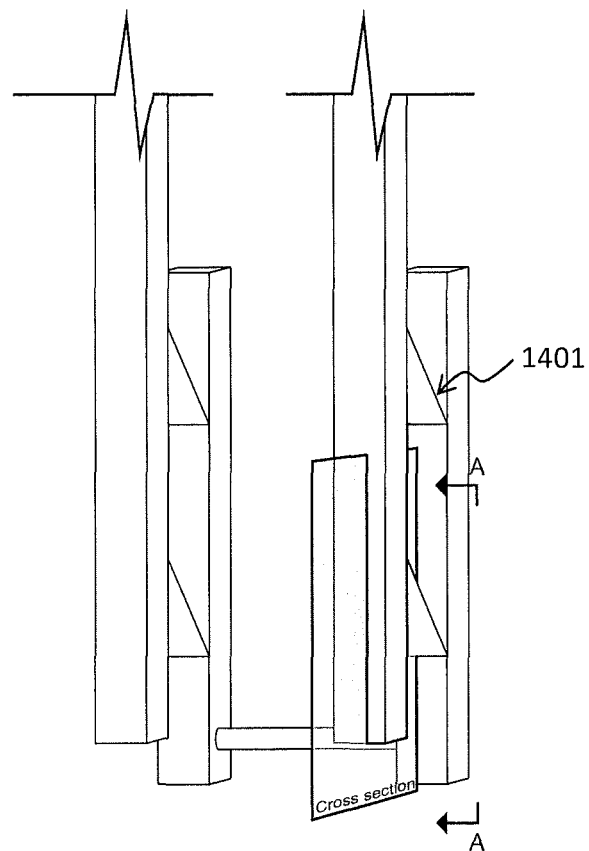
Figure 23:
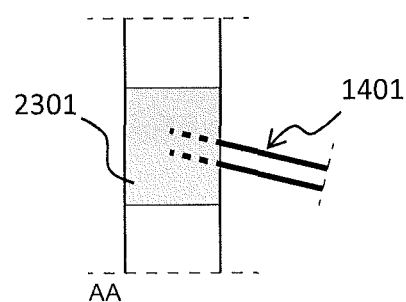

FIGS. 22-23 shows a variation of the embodiments shown in FIGS. 14-21 where said one or more flexible members 1401 pass through a hole on one side of a hollow wheel structure or hollow frame structure and are rigidly mounted into a rigid insert 2301 rigidly mounted to the corresponding structure.

Figure 24:
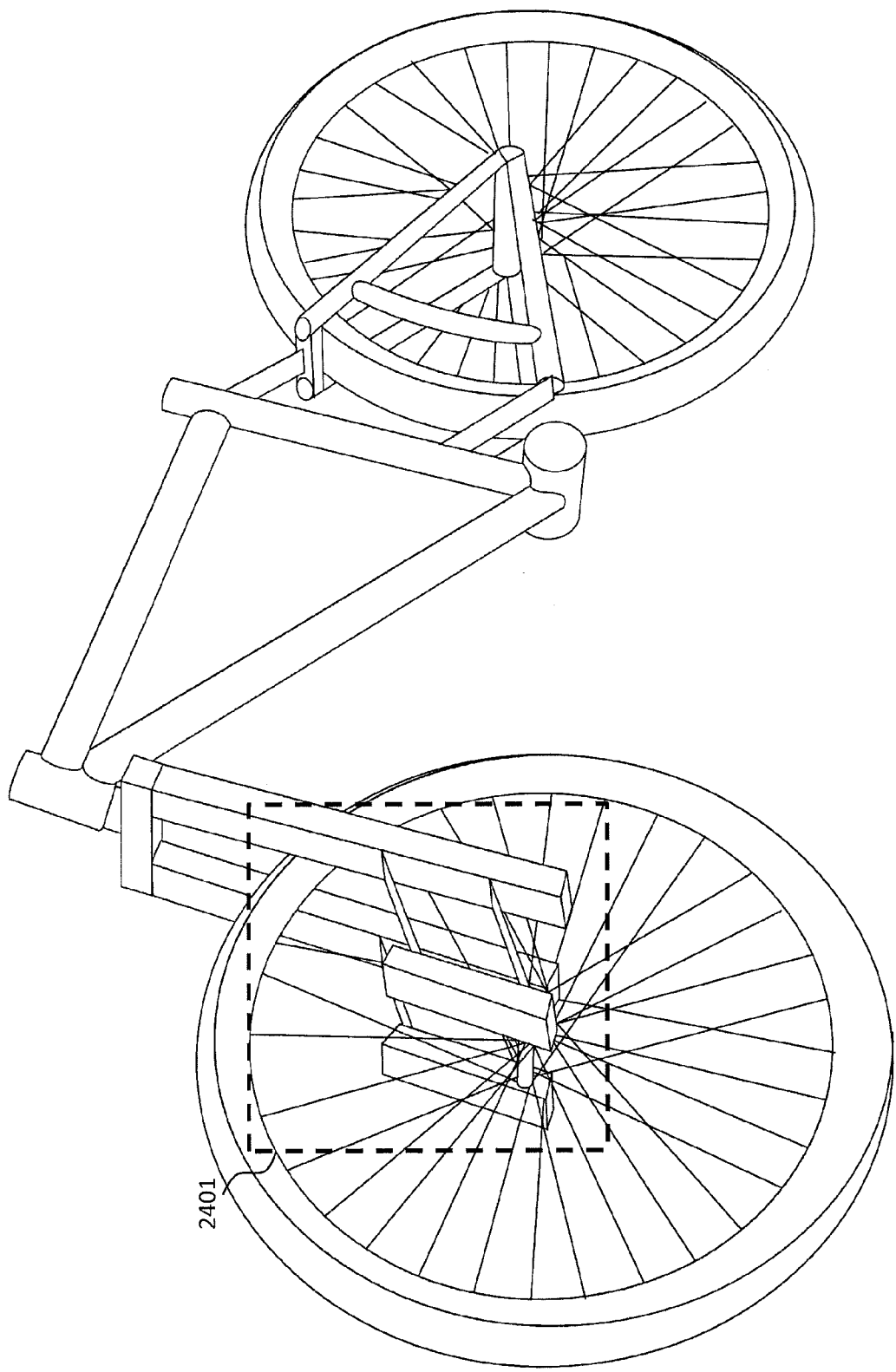
FIG. 24 shows an embodiment where the front suspension system shown in FIG. 1 has been reversed.

FIG. 24 shows an embodiment of the invention 2401 where the front wheel suspension system 100 shown in FIG. 3 has been reversed so that the wheel structure is positioned anteriorly to the bicycle fork legs.

Figure 25:
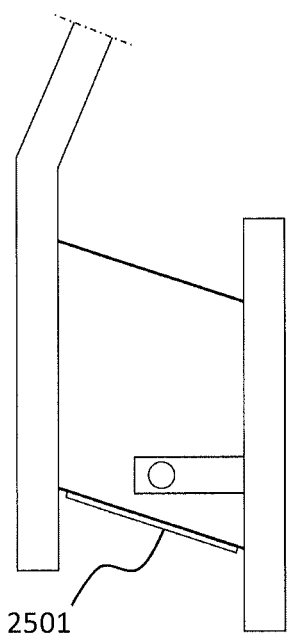
FIGS. 25-26 show different embodiments of the present invention where a flexible member is protected with a resilient material.
Figure 26:
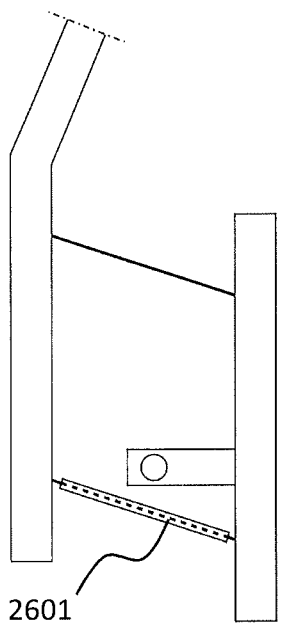

FIG. 25 and FIG. 26 show embodiments of the invention where one or more of said two or more flexible members is covered, either partially or fully, with a resilient protective material 2501, 2601.

Figure 27:
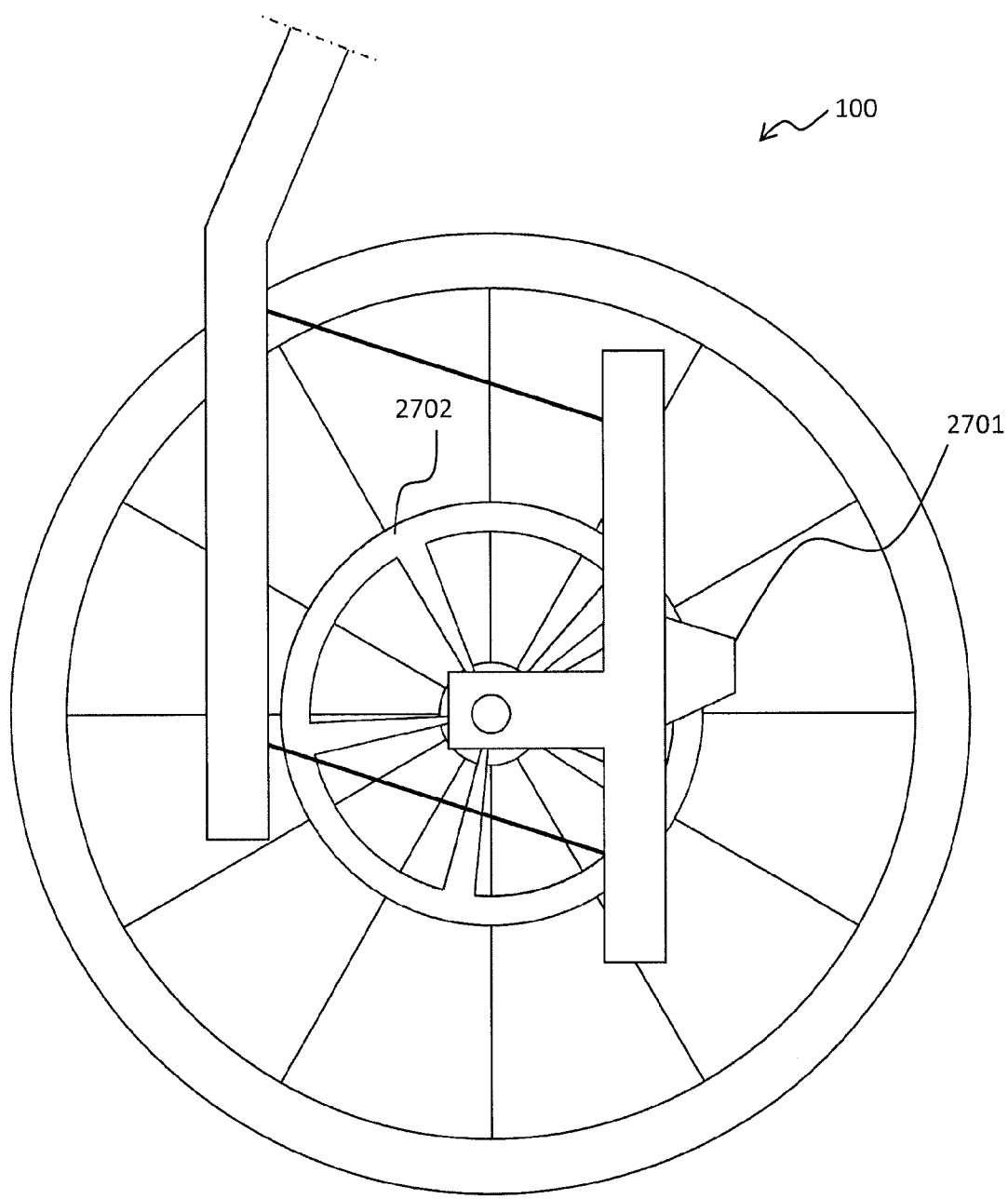
FIG. 27 shows an embodiment of the front wheel suspension system shown in FIG. 3 where the front wheel suspension system further comprises a disc brake caliper and the front wheel comprises a disc brake disc.

FIG. 27 shows an embodiment of the front wheel suspension system 100 from FIG. 3 where a disc-brake caliper 2701 is rigidly mounted to the wheel structure and the wheel comprises a disc-brake disc 2702.

Figure 28:
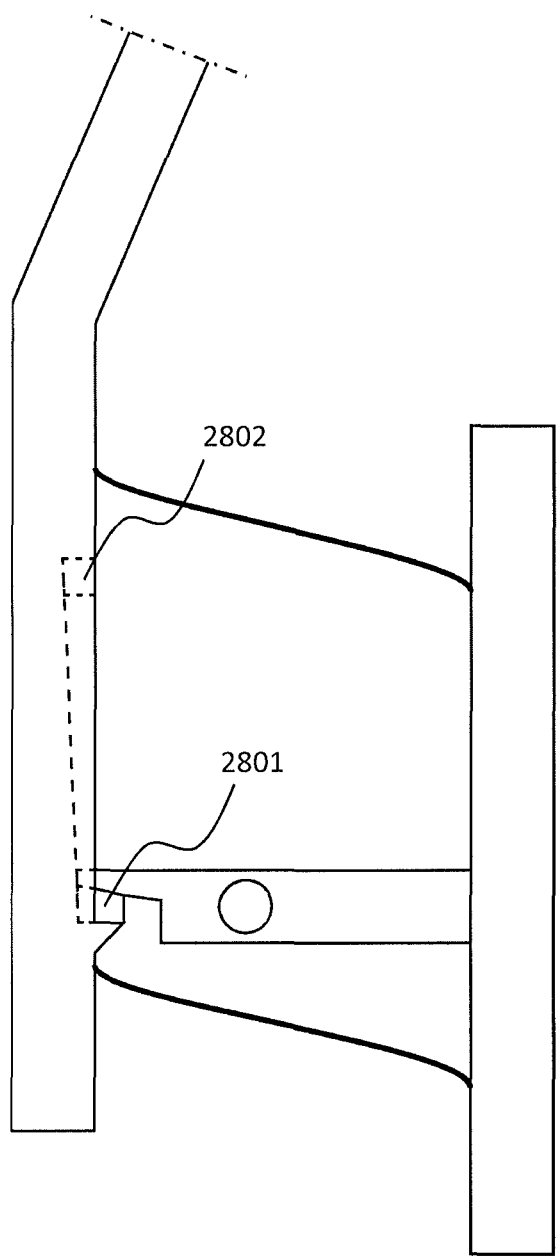
FIGS. 28, 29, 30 and 31 show different embodiments of pre-loading and bump-stopping the front wheel suspension system shown in FIG. 2.

FIG. 28 shows an embodiment of the front wheel suspension system 100 from FIG. 3 where the said two or more flexible members are pre-loaded mechanically by a resilient member 2801 squeezed between the frame structure and wheel structure in rest position, preventing the suspension system from excessive suspension rebound. Furthermore a secondary resilient pad 2802 provides bump-stop functionality for the mechanism and prevents the said two or more flexible members from mechanical failure under extreme loads.

Figure 29:
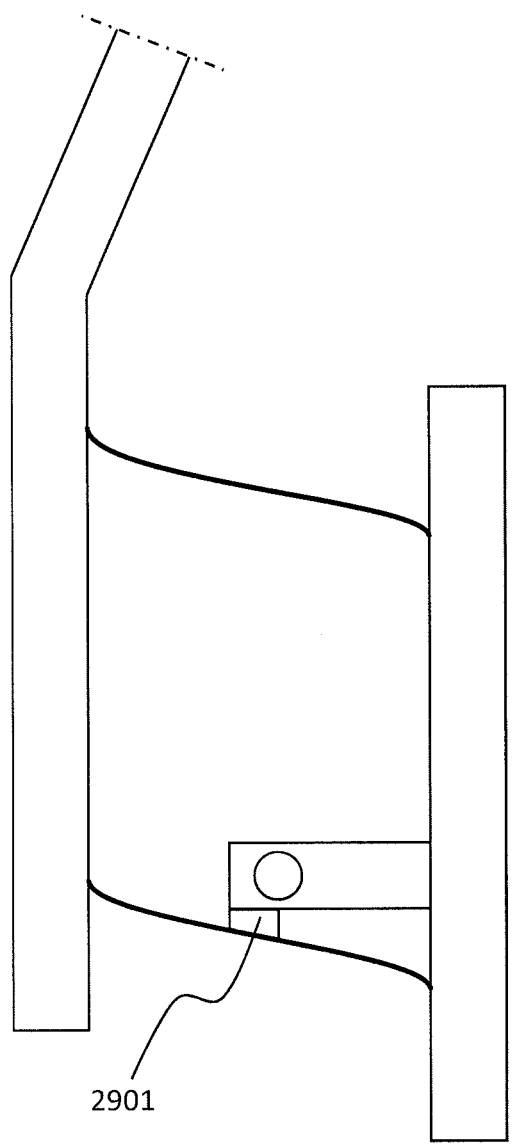

FIG. 29 shows a variation of the pre-loading method from FIG. 28, here the resilient pad 2901 is squeezed between the wheel structure and one or more of said flexible members in rest position.

Figure 30:
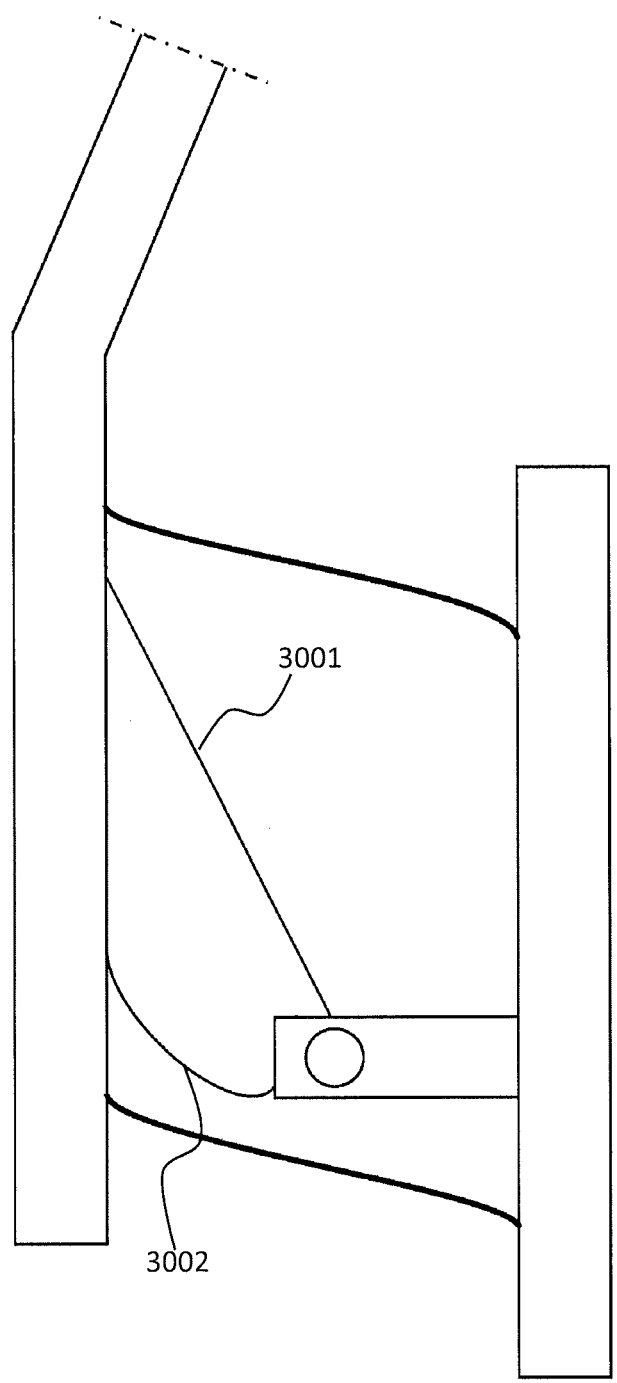

FIG. 30 shows an embodiment of the front wheel suspension system from FIG. 3 where the said two or more flexible members are pre-loaded by a tensioned strap 3001 between the wheel structure and the frame structure in rest position, furthermore a secondary strap 3002 provides bump-stop functionality for the mechanism and prevents the said two or more flexible members from mechanical failure under extreme loads.

Figure 31:
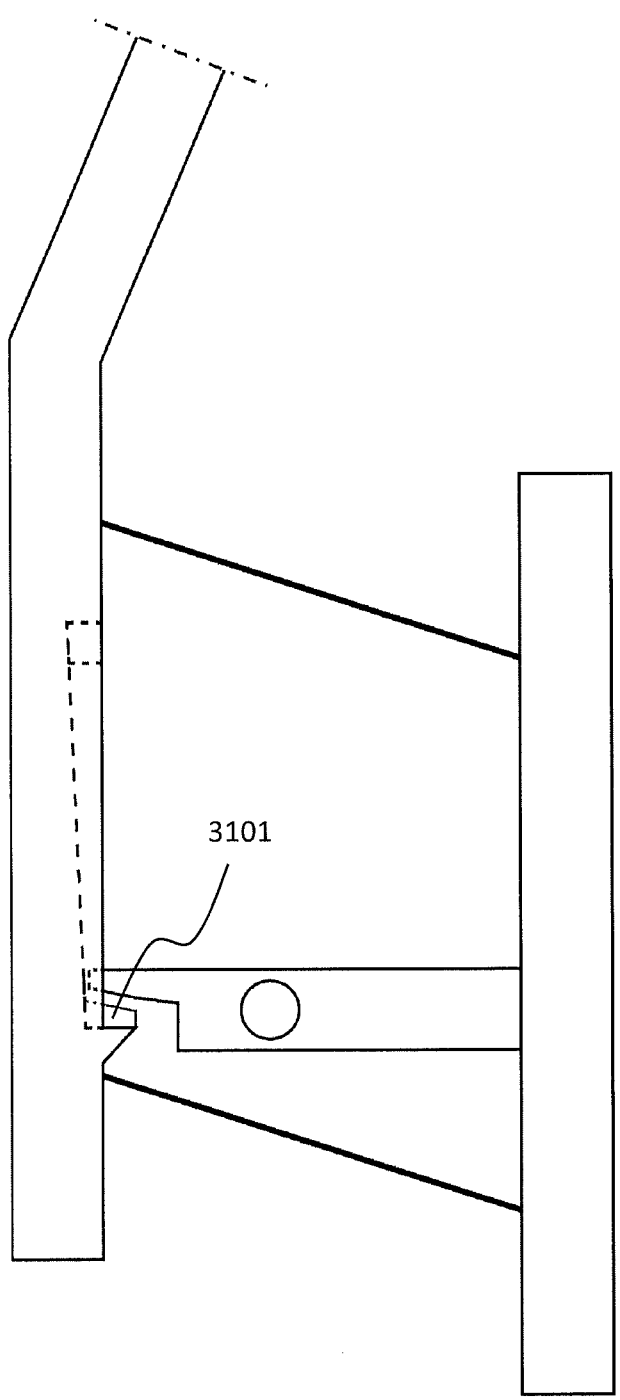

FIG. 31 shows a variation of the embodiment on FIG. 28 where during rest position the said resilient member 3101 is only in contact with either wheel structure or frame structure and can have some spacing towards the other part. In this configuration the resilient member does not pre-load the suspension system but gets in contact with the opposite part during excessive rebound and absorbs rebound energy.

Figure 32:
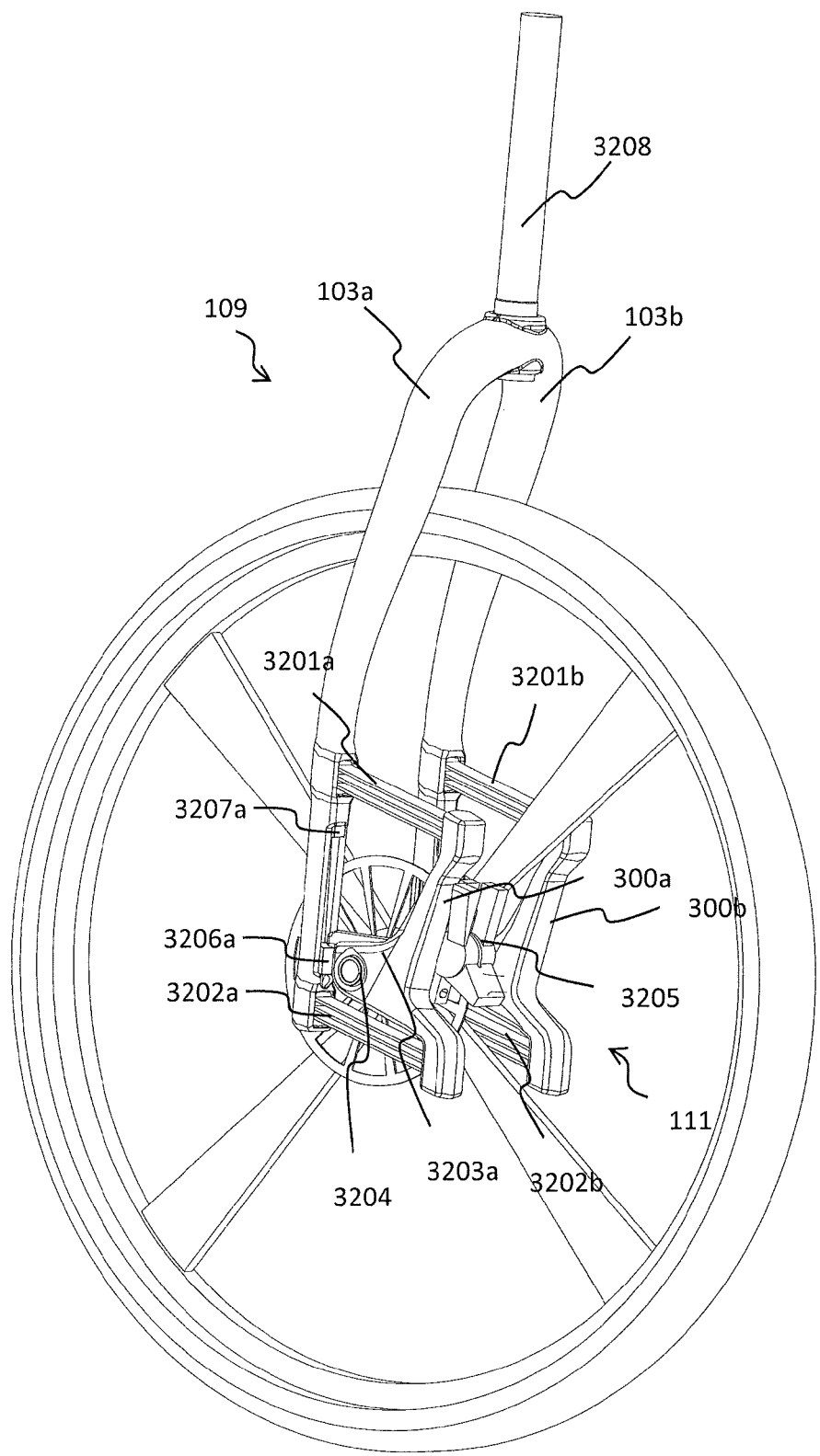
FIG. 32 shows a perspective view of an embodiment of a front wheel suspension system according to the present invention.

FIG. 32 shows a variation of the front wheel suspension system 100 from FIG. 3 where each fork leg 103a, 103b comprises two vertically spaced bundles of two or more tightly spaced flexible members 3201a,b 3202a,b rigidly mounted to corresponding fork legs and the ends of corresponding front wheel structure beams 300a,b of a front wheel structure 111 located posteriorly to said fork legs. The bundles of two or more tightly spaced flexible members are substantially parallel and of substantially equal length. The bundles of two or more tightly spaced flexible members 3202a,b that are placed at the lower end of the wheel structure are below the front hub mount 3204 while the upper bundles of two or more tightly spaced flexible members 3201a,b are located above the front hub mount. Said bundles of two or more tightly spaced flexible members are tilted upwards, looking from the wheel structure 111 and towards the fork legs of the frame structure 109, by an angle of between 5° to 25° relatively to perpendicular to a line running through the fork's steerer tube 3208. Said front wheel structure comprises anteriorly protruding parts 3203a, 3203b (3203b not shown) comprising a hub mount 3204, a rigidly mounted disc-brake caliper 3205 on either side, resilient members 3206a, 3206b (3206b not shown) providing pre-load of the suspension system and/or absorbing excessive rebound energy and resilient members 3207a, 3207b (3207b not shown) providing bump-stop functionality of the suspension system and preventing flexible members from mechanical failure under extreme loads.

In one embodiment said wheel structures and or frame structure are made of metal or a composite material such as but not limited to, resin impregnated carbon fiber, glass fiber, flax fiber, aramid fiber, boron fiber or basalt fiber.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A wheel vehicle suspension system, comprising:
   a frame structure including a two legged fork;
   a wheel structure comprising wheel structure beams positioned posterior to the two legged fork,
   two sets of at least two spaced apart flexible members extending between respective one of two legs of said two legged fork and said wheel structure beams such that one of said two sets of spaced apart flexible members is located on each lateral side of a suspended wheel,
   wherein each of said wheel structure beams comprises a hub mount located above one or more of said at least two spaced apart flexible members on a side of the suspended wheel and below one or more of said at least two spaced apart flexible members on the side of the suspended wheel and where said hub mounts are positioned opposing each other and are adapted to receive a rigid connection to one another via a hub of the suspended wheel,
   wherein the wheel structure beams are provided on both lateral sides of a front wheel,
   wherein each of said hub mounts is anteriorly located in a respective wheel structure beam of said wheel structure beams, and
   wherein each flexible member of said two sets of at least two spaced apart flexible members is rigidly mounted to one of said wheel structure beams on one end and rigidly mounted to a respective fork leg of the two legged fork on another end.

2. A suspension system according to claim 1, wherein said at least two spaced apart flexible members are substantially flat plates, dimensions of a cross section being such that a width is substantially greater than its height, said width being substantially parallel to ground when said vehicle suspension system is in a vertical position in relation to the ground.

3. A suspension system according to claim 1, wherein said at least two spaced apart flexible members are of substantially equal length and are arranged in a substantially parallel way.

4. A suspension system according to claim 1, wherein said at least two spaced apart flexible members extend, in relation to the wheel structure, in an upwards direction from said wheel structure and forward towards the frame structure.

5. A suspension system according to claim 1, wherein said at least two spaced apart flexible members form one or more bundles of closely spaced flexible members.

6. A suspension system according to claim 1, further comprising: an upwardly extending damper arranged from the wheel structure to the frame structure.

7. A suspension system according to claim 1, wherein said at least two spaced apart flexible members of said suspension system connecting the wheel structure to the frame structure are substantially laterally symmetric around the suspended wheel.

8. A vehicle comprising a suspension system according to claim 1.

9. A vehicle according to claim 8, wherein said vehicle being selected from being:
   a bike,
   a bicycle,
   a motorbike,
   a motorized bicycle,
   a scooter or
   a tricycle.

* * * * *